United States Patent
Pajovic et al.

(10) Patent No.: US 10,514,437 B2
(45) Date of Patent: Dec. 24, 2019

(54) DEVICE LOCALIZATION USING RSS BASED PATH LOSS EXPONENT ESTIMATION

(71) Applicant: Mitsubishi Electric Research Laboratories, Inc., Cambridge, MA (US)

(72) Inventors: Milutin Pajovic, Cambridge, MA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 605 days.

(21) Appl. No.: 14/860,867

(22) Filed: Sep. 22, 2015

(65) Prior Publication Data
US 2017/0082723 A1  Mar. 23, 2017

(51) Int. Cl.
*G01S 5/02* (2010.01)
*H04W 64/00* (2009.01)

(52) U.S. Cl.
CPC ............ *G01S 5/0252* (2013.01); *G01S 5/02* (2013.01); *G01S 5/0278* (2013.01); *G01S 5/0294* (2013.01); *H04W 64/003* (2013.01)

(58) Field of Classification Search
CPC ........ G01S 5/00; G01S 5/0252; G01S 5/0278; G01S 5/0294; G01S 5/0045; G01S 5/0063; G01S 5/14; G01S 5/145; H04W 64/00; H04W 64/003
See application file for complete search history.

(56) References Cited

U.S. PATENT DOCUMENTS

| | | | |
|---|---|---|---|
| 8,077,079 B2 | 12/2011 | Kaiser et al. | |
| 2005/0285793 A1* | 12/2005 | Sugar | G01S 5/0252 342/465 |
| 2006/0149475 A1* | 7/2006 | Kellum | G01S 11/06 701/300 |

(Continued)

OTHER PUBLICATIONS

Revisiting Gaussian Process Regression Modeling for Localization in Wireless Sensor Networks, Sensors 2015, (http://www.mdpi.com/journal/sensors), Sep. 2015 (Richter) (Year: 2015).*

(Continued)

*Primary Examiner* — Bernarr E Gregory
*Assistant Examiner* — Daniel P Malley, Sr.
(74) *Attorney, Agent, or Firm* — Gennadiy Vinokur; James McAleenan; Hironori Tsukamoto

(57) ABSTRACT

A method for tracking a device determines correlations among locations of the device including a set of previous locations of the device and an initial estimate of a current location of the device, and determines, for each access point (AP), a current path loss exponent for the current location of the device using previous path loss exponents determined for the previous locations of the device and the correlations among the locations of the device. The method determines the current location of the device according to a path loss model using received signal strengths (RSS) of signals received from each AP at the current location and the current path loss exponent determined for each AP. The current path loss exponent for each AP are updated using the current location of the device and the RSS of signals received from the corresponding AP.

20 Claims, 8 Drawing Sheets

(56) References Cited

U.S. PATENT DOCUMENTS

| | | | | |
|---|---|---|---|---|
| 2010/0238862 A1* | 9/2010 | Davidson | ............ | H04W 4/029 370/328 |
| 2012/0056786 A1* | 3/2012 | Pandey | .................. | G01S 5/021 342/463 |
| 2013/0039391 A1* | 2/2013 | Skarp | .................... | H04W 4/023 375/148 |
| 2013/0300607 A1* | 11/2013 | Mansour | ............. | G01S 5/0252 342/451 |
| 2014/0133344 A1* | 5/2014 | Seitz | ....................... | G01S 5/10 370/252 |
| 2014/0368386 A1* | 12/2014 | Mansour | ............. | G01S 5/0294 342/461 |
| 2015/0119076 A1 | 4/2015 | Cohen et al. | | |
| 2016/0037302 A1* | 2/2016 | Sen | ........................ | G01S 11/06 455/456.2 |

OTHER PUBLICATIONS

Path loss exponent estimation for wireless sensor network localization, Computer Networks: The International Journal of Computer and Telecommunications Networking, vol. 51 Issue 10, Jul. 2007 (Mao) (Year: 2007).*

Bahillo et al. "Hybrid RSS-RTT Localization scheme for wireless networks," Indoor Positioning and indoor navigation (IPIN) 2010 International Conference on. Sep. 15, 2010, pp. 1-7.

Jun Wang et al. "Cramer-Rao Bounds for Joint RSS/DoA-Based Primary-User Localization in Cognitive Radio Networks," IEEE Transactions on Wireless Communications, IEEE Service Center. vol. 12, No. 3, Mar. 1, 2013. pp. 1363-1375.

Jie Yang et al. "Indoor Localization using Improved RSS-Based Lateration Methods," Global Telecommunications Conference, Nov. 30, 2009. pp. 1-6.

* cited by examiner

DEVICE LOCALIZATION USING RSS BASED PATH LOSS EXPONENT ESTIMATION

FIELD OF THE INVENTION

The invention relates generally to indoor localization, and more particularly to unsupervised localization of a device using received signal strength (RSS) measurements and path loss exponent estimation.

BACKGROUND OF THE INVENTION

Wireless networks, such as wireless local area networks (WLANs) are widely used. Locating radios in a wireless communication network such as a WLAN enables new and enhanced features, such as location-based services and location-aware management. Location-based services include, for example, locating or tracking of a wireless device, assigning a device, e.g., a closest printer to a wireless station of a WLAN, and controlling the wireless device based on its location.

Accurate indoor localization using a satellite based Global Positioning System (GPS) is difficult to achieve because the GPS signals are attenuated when the signals propagate through obstacles, such as roof, floors, walls and furnishing. Consequently, the signal strength becomes too low for localization in indoor environments.

Concurrently, the enormous growth of WiFi radio frequency (RF) chipsets embedded within different devices, such as computers, smartphones, stereos, and televisions, prompt a need for indoor location methods for WiFi equipped devices based on, or leveraging, existing WiFi signals, i.e., any signal based on the Electrical and Electronics Engineers' (IEEE) 802.11 standard. Some methods for indoor localization use signal strength measurement and assume that the received signal power is an invertible function of the distance, thus knowledge of the received power implies a distance from the transmitter of the signal. Other methods attempt to make further use of the large scale deployment of WiFi devices along with advances in machine learning and propose fingerprinting along with self-localization and mapping.

However, the methods that solely rely on conventional Wi-Fi chipsets for indoor localization use measured received signal strength (RSS) levels obtained from the Wi-Fi chipsets. Those methods require training, which includes measuring the RSS levels offline in the indoor environment. The measurements are then supplied to the localization method during online use.

One limitation associated with the training is in that the offline measurements are often unreliable. This is because the RSS levels in the environment vary dynamically over time, for example, due to changes in the number of occupants, the furnishing and locations of the APs. This implies that the training needs to be repeated whenever the environment changes.

In addition, the offline methods use predetermined path loss exponents in a path loss model with online measurements of the RSS levels to determine the indoor location. After those path loss exponents are predetermined, the values of the path loss exponents stay the same for the entire process of the location tracking and assumed the same for the entire sections of the environment.

Therefore, it is desired to perform RSS based localization in an unsupervised manner, i.e., without training.

SUMMARY OF THE INVENTION

Some embodiments of an invention provide a system and a method for localization of a device by measuring received signal strength (RSS) levels of signals transmitted by a set of access points (APs) arranged in an enclosed environment. The method uses a path loss model for the RSS level. The log-distance path loss model is a radio propagation model that predicts path loss a signal encounters in an enclosed environment as a function of distance. According to this model, the RSS level of the received reference signals transmitted by a particular AP depends on a distance to the AP and the associated path loss exponent. The path loss exponent is an unknown model parameter. There is a single model parameter for each AP at a given location.

Some embodiments of an invention are based on a recognition that path loss exponents for different locations of a device can vary within the enclosed environment. However, some embodiments are based on a realization that there is a correlation between the path loss exponents for neighboring locations. For example, a current path loss exponent for a current location can be represented as a function of a previous path loss exponent for a previous location and a distance between the previous and the current locations. Intuitively, it is possible to suggest that the greater the distance between the previous and the current locations, the greater the difference between the path loss exponents for those locations. However, a number of observations and experiments demonstrate that the correlation between path loss exponents dependents on distances among those locations.

Some embodiments of the invention are based on a realization that if an initial estimate of a current location of the device can be determined, that initial estimate can be used to determine correlations between that location and the previous locations of the device which, in turn, can be used to determine the path loss exponent, needed to update the initial estimate of the location of the device. Subsequently, the updated initial estimate of the location and the path loss exponent determined for that location estimate can be revised using RSS levels of signals transmitted by each AP. To that end, some embodiments provide a system and a method for tracking a device by updating iteratively the path loss exponents and the location of the device using the correlations between neighboring locations including an initial estimate of a current location and a corresponding set of path loss exponents.

For example, one embodiment of the invention uses Gaussian Processes (GP) to estimate path loss exponents corresponding to some location. The GP models highly complicated relation between a location and corresponding path loss exponents associated with different access points. The correlation structure is described via parametrized kernel function, whose hyper-parameters are determined in real time.

Accordingly, one embodiment of the invention discloses a method for tracking a device. The method includes determining correlations among locations of the device, wherein the locations includes a set of previous locations of the device and an initial estimate of a current location of the device; determining, for each access point (AP), a current path loss exponent for the current location of the device using previous path loss exponents determined for the previous locations of the device and the correlations among the locations of the device; determining the current location of the device according to a path loss model using received signal strengths (RSS) of signals received from each AP at the current location and the current path loss exponent determined for each AP; and updating the current path loss exponent for each AP using the current location of the device and the RSS of signals received from the corresponding AP. Steps of the method are performed using a processor.

Another embodiment discloses a method for tracking a device, wherein the method iteratively estimates a current location of the device and path loss exponents corresponding to access points (APs) at the current location. An iteration includes determining an initial estimate of the current location of the device; determining correlations among locations of the device, wherein the locations includes a set of previous locations of the device and the initial estimate of a current location of the device; determining, for each AP, a current path loss exponent using previous path loss exponents corresponding to the set of previous locations of the device, and the correlations among the locations of the device; determining the current location of the device according to a path loss model using strength levels of signals received from each AP at the current location and the current path loss exponent determined for each AP; and updating the current path loss exponent for each AP using the current location of the device and the strength levels of signals received from the corresponding AP. Steps of the method are performed using a processor.

Yet another embodiment discloses a device including a measurement unit configured to determine an initial estimate of a current location of the device; a transceiver configured to determine strength levels of signals received at the current location, wherein the signals are transmitted by a set of access points (APs) arranged in an environment; and a controller configured to update iteratively the initial estimate of the current location by applying current path loss exponents to the strength levels of the signals, wherein the controller includes a processor for determining the current path loss exponent using correlations among locations of the device including a set of previous locations of the device and the initial estimate of the current location and previous path loss exponents determined for the previous locations of the device.

DETAILED DESCRIPTION OF THE PREFERRED EMBODIMENTS

Figure 1A:
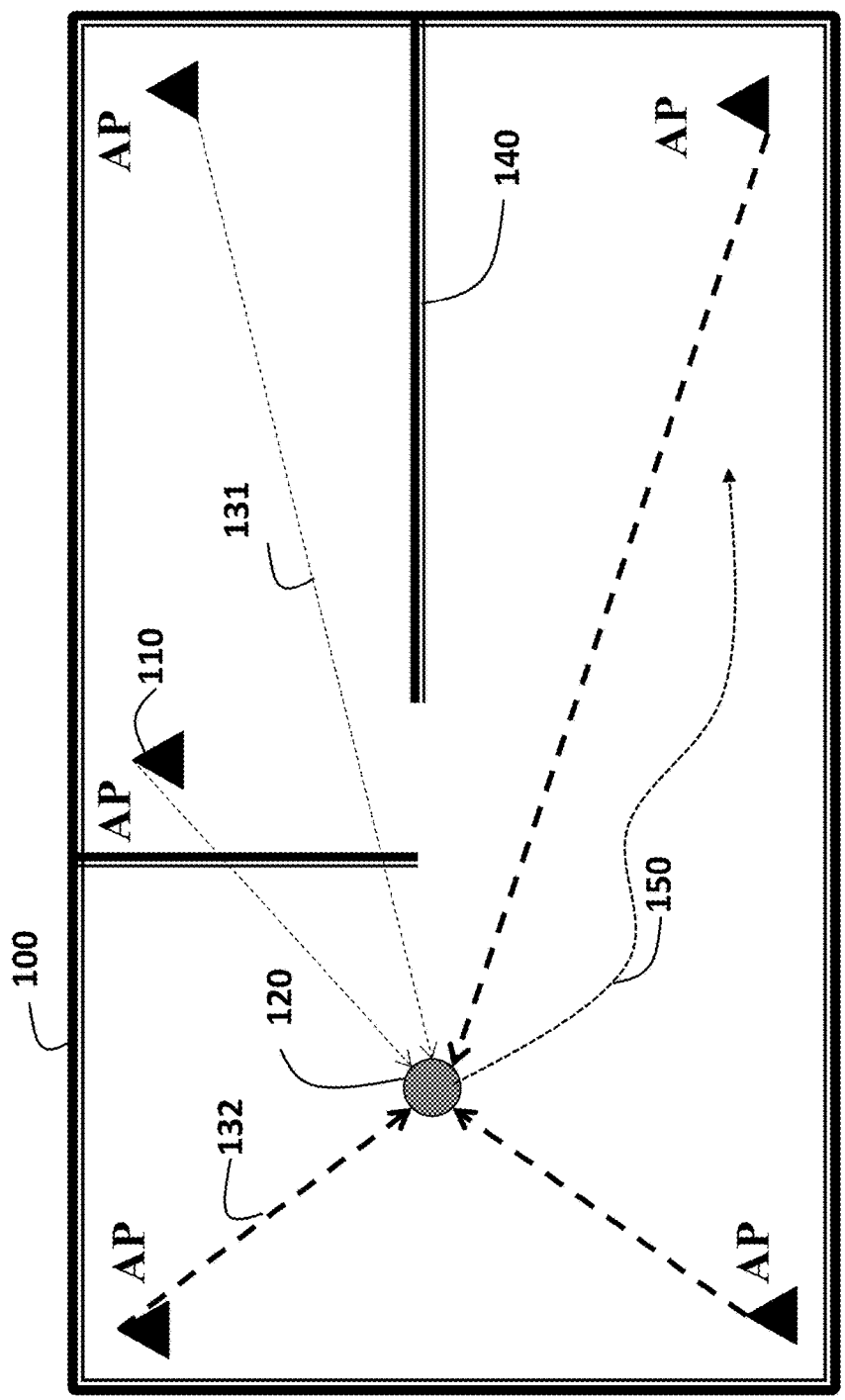
FIG. 1A is a schematic of an environment and access points for device localization using received signal strength (RSS) measurement according to some embodiments of the invention.

FIG. 1A shows a schematic of localization problem using received signal strength (RSS) measurement according to some embodiments of the invention that determine location of a device 120 in an enclosed environment 100 using access points (APs) 110. The enclosed environment can be, for example, interior of a home, building, underground, even an urban canyon, etc., with multiple obstacles such as walls 140, furnishings, etc. The device can be, for example, a mobile robot, smart phone, portable computer, etc. In one embodiment the device moves along an unknown path 150. After the location of the device is determined, the device can be controlled according to its current location.

Some embodiments of an invention provide a system and a method for localization of a device by measuring received signal strength (RSS) levels of signals transmitted by a set of access points (APs) arranged in an enclosed environment. The method uses a path loss model for the RSS level. The log-distance path loss model is a radio propagation model that predicts path loss a signal encounters in an enclosed environment as a function of distance. According to this model, the RSS level of the received reference signals transmitted by a particular AP depends on a distance to the AP and the associated path loss exponent. The path loss exponent is an unknown model parameter. There is a single model parameter for each AP.

Figure 1B:
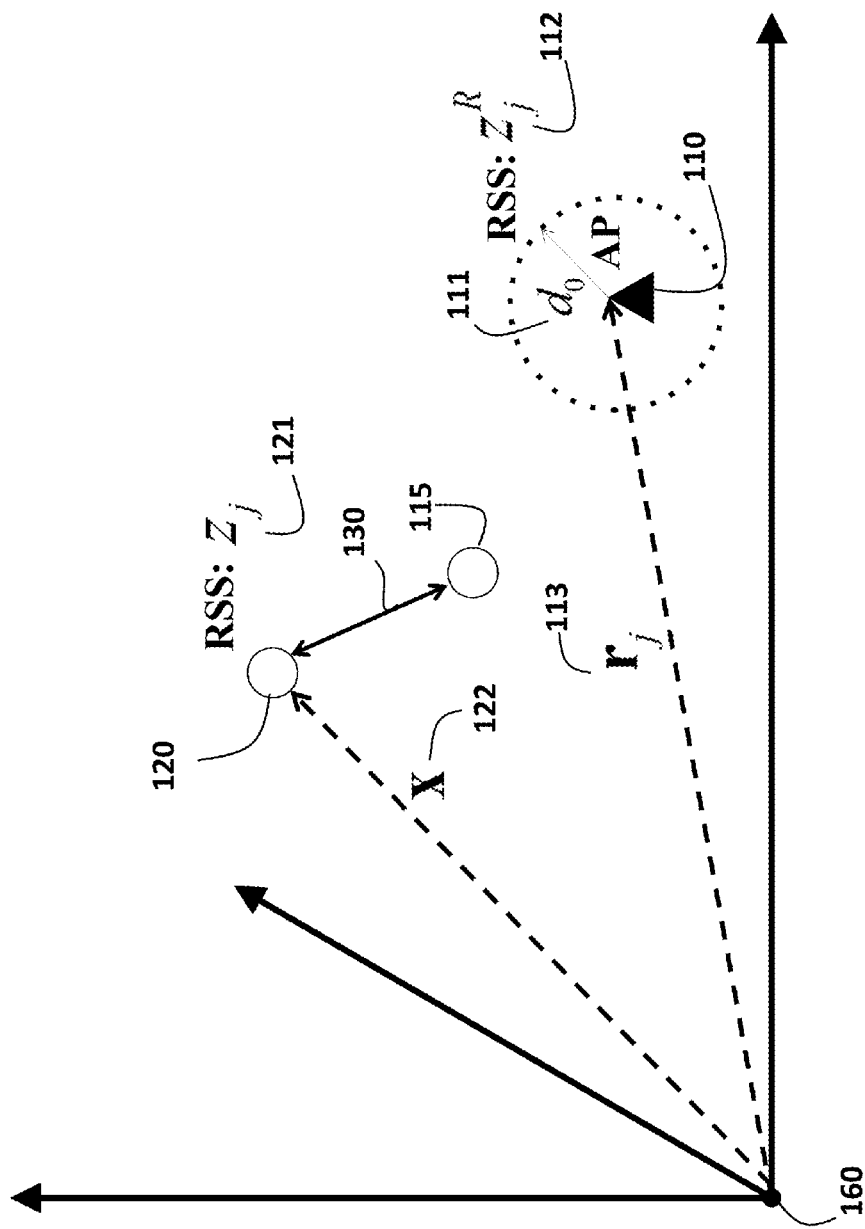
FIG. 1B is a graphic of device localization using the RSS levels of the reference signals according to some embodiments of the invention.

FIG. 1B graphically shows a method for determining location of the device 120 using the RSS levels 121 of the reference signals transmitted by the APs 110. The reference signals can be transmitted continuously, periodically, or in response to a localization request by the device. The device is located at an unknown location x 122 in an arbitrary coordinate system 160 associated with the enclosed environment. The coordinate system can be two or three dimensional.

A location of the $j^{th}$ AP 110 in this coordinate system is denoted as $r_j$ 113, where j=1, . . . , N. The AP j is characterized by reference received signal strength (RSS) level $z_j^R$ 112 at a radial distance $d_0$ 111 from the AP. The locations $r_j$ and the reference RSS levels $z_j^R$ at the distance $d_0$ from the AP are known. The positions of the access points with respect to a coordinate system associated with the enclosed area are known 3-dimensional vectors $r_1, r_2, \ldots, r_M$. An unknown position is estimated from the measured received signal strength (RSS) levels of the reference signals transmitted from the access points. As some location $x_n$, the measured RSS levels are $z_1(n), z_2(n), \ldots, z_M(n)$. These measurements are collected into a column vector z(n), where n=1, 2, . . . indexes localization requests along some traversed path.

The RSS level $z_m(n)$ at location $x_n$ is modeled using the path loss model, given by $$z_m(n) = z_m^R - 10 h_m(n) \log_{10} \frac{\|x_n - r_m\|}{d_0} + v_m(n), \tag{1}$$

where $z_m^{(R)}$ is the reference RSS level at distance $d_0$ from the access point at location $r_m$, $h_m(n)$ is the corresponding path loss exponent, and $v_m(n)$ is zero mean, white, Gaussian measurement noise.

In addition to RSS measurements, the position estimation is also aided with the estimates of the location change between two consecutive localization requests. That is, at n-th localization request, we assume that $$\Delta x_n = x_n - x_{n-1}, \quad (2)$$

is known. This estimate can be obtained from the inertial measurement unit (IMU) measurements.

Some embodiments of an invention are based on a recognition that path loss exponents for different location of a device can vary within the enclosed environment. However, some embodiments are based on a realization that there is a correlation between the path loss exponents for neighboring locations. For example, a current path loss exponent for a current location can be represented as a function of a previous path loss exponent for a previous location and a distance 130 between the previous 115 and the current 120 locations. Intuitively, it is possible to suggest that the greater the distance between the previous and the current locations, the greater the difference between the path loss exponents for those locations. However, a number of observations and experiments demonstrate that the correlation between path loss exponents at some locations is statistical and dependents on correlation between distances among those locations.

Accordingly, if an initial estimate of a current location of the device can be determined, that initial estimate can be used to evaluate correlations among locations of the device, and such correlations can be used to determine the path loss exponent for initial estimate of the location of the device. Subsequently, the initial estimate of the location and the path loss exponent determined for that initial estimate can be revised using RSS levels of signals transmitted by each AP. To that end, some embodiments provide a system and a method for tracking a device by updating iteratively the path loss exponents and the location of the device using the correlation between a set of neighboring locations including an initial estimate of a current location and a corresponding set of path loss exponents.

Figure 1C:
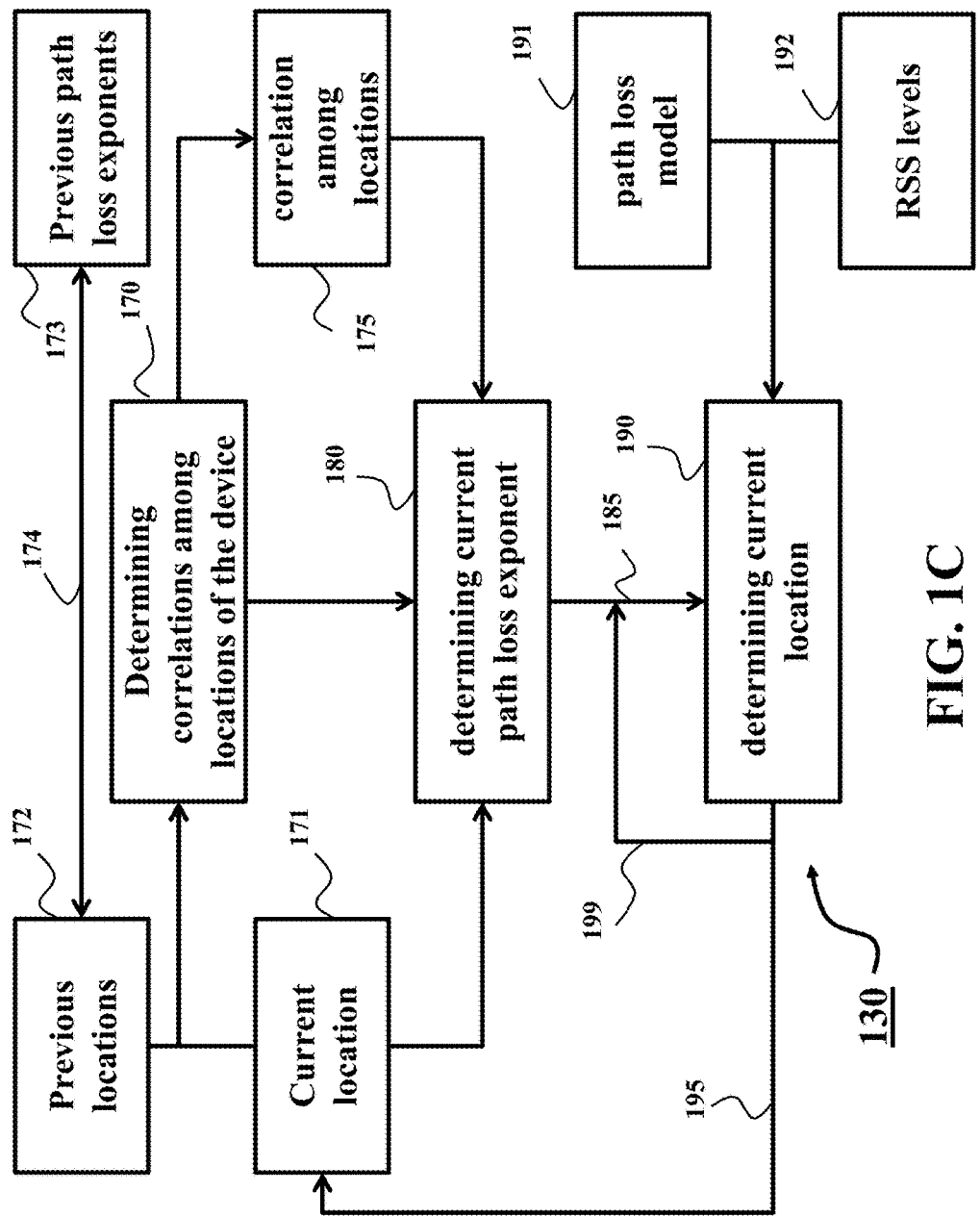
FIG. 1C is a block diagram of a method for tracking a device according to one embodiment of the invention.

FIG. 1C shows a block diagram of a method for tracking a device according to one embodiment of the invention. This embodiment can update iteratively a set of locations of the device and a set of path loss exponents corresponding to the set of locations using correlations among locations of the device determined within an iteration.

The method determines 170 correlations 175 among locations of the device. The locations of the device include a set of previous locations 172 of the device and an initial estimate of a current location 171 of the device. The initial estimate 171 can be determined using a GPS, the triangulation of the RSS levels, and/or using internal measurements unit (IMU) that can measure displacement of the device from a previous location.

The set of previous locations 172 can be determined during the tracking of the device. For example, the current location becomes the previous location for the subsequent iteration. The previous locations and the corresponding 174 path loss exponents 173 determined for those previous locations are inputs to the current iteration of the method.

The method determines 180, for each access point (AP), a current path loss exponent 185 for the current location of the device using previous path loss exponents determined for previous locations of the device and correlations 175 among locations of the device. For example, the previous path loss exponent can be selected from the set 173 as the path loss exponent corresponding 174 to the closest location from the set 172 or the location most recently determined.

Next, the method determines 190 the current location 195 of the device according to a path loss model 191 using strength levels 192 of signals received from each AP at the current location and the current path loss exponent 185 determined for each AP. The initial estimate 171 of the current location can be updated with the determined location 195.

Also, after the current location 195 is determined, the method updates 199 the current path loss exponent for each AP using the current location 195 of the device and the strength levels 192 of signals received from the corresponding AP. In such a manner, for the subsequent iteration, more accurate values of the location 195 and corresponding path loss exponent 185 can be used.

Figure 2:
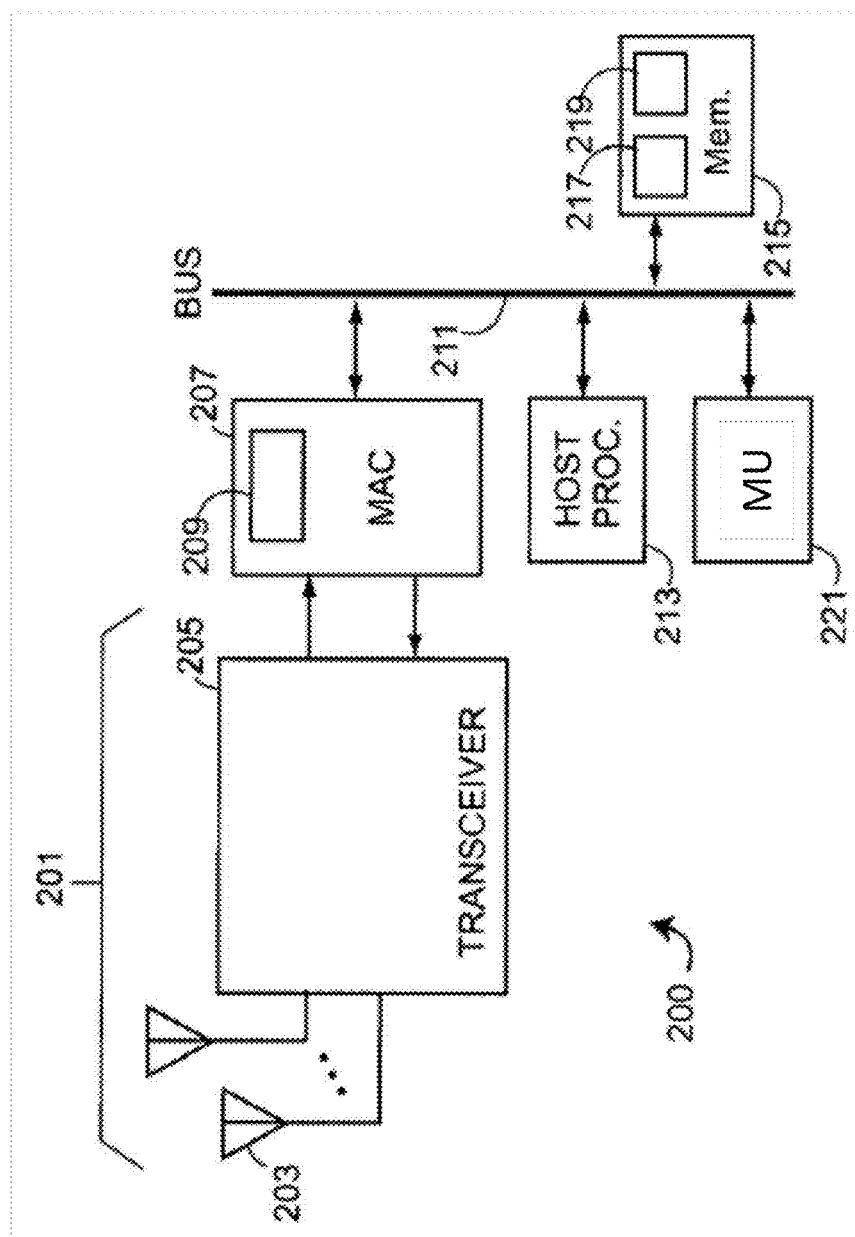
FIG. 2 is a block diagram of a device to be tracked according to some embodiments of the invention.

FIG. 2 shows a block diagram of a device 200 according to some embodiments of the invention. The device 200 can employ the principles of different embodiments of the invention for determining and/or tracking its location 195 and/or performing various control function in dependence of the location.

The device 200 includes a transceiver 205 configured to determine strength levels of signals received at the current location, wherein the signals are transmitted by a set of access points (APs) arranged in an environment. For example, the device can include a radio part 201 having one or more antennas 203 coupled to a radio transceiver 205 including an analog RF part and/or a digital modem. The radio part thus implements the physical layer (the PHY). The digital modem of PHY 201 is coupled to a media access control (MAC) processor 207 that implements the MAC processing of the station. The MAC processor 207 is connected via one or more busses, shown symbolically as a single bus subsystem 211, to a host processor 213. The host processor includes a memory subsystem 215, e.g., random access memory (RAM) and/or read only memory (ROM) connected to a bus.

The device 200 can also include a measurement unit 221 configured to determine an initial estimate of a current location of the device. The measurement unit 221 can include one or combination of a GPS, a processor performing the triangulation of the RSS levels, and/or other internal measurements units (IMU) that can measure displacements of the device from a previous location using e.g., accelerometers, gyroscopes and magnetometers.

In one embodiment, the MAC processing, e.g., the IEEE 802.11 MAC protocol is implemented totally at the MAC processor 207. The processor 207 includes a memory 209 that stores the instructions for the MAC processor 207 to implement the MAC processing, and in one embodiment, some or all of the additional processing used by the present invention. The memory is typically but not necessarily a ROM and the software is typically in the form of firmware.

The MAC processor is controlled by the host processor 213. In one embodiment, some of the MAC processing is implemented at the MAC processor 207, and some is implemented at the host. In such a case, the instructions for the host 213 to implement the host-implemented MAC processing are stored in the memory 215. In one embodiment, some or all of the additional processing used by the present invention is also implemented by the host. These instructions are shown as part 217 of memory.

The device 200 also includes a controller configured to update iteratively the initial estimate of the current location by applying current path loss exponents to the strength levels of the signals. The controller can be implemented using a processor, e.g., the processor 207 or 213. The processor is configured for determining the current path loss exponents as a function of previous path loss exponents determined for previous locations of the device, based on correlations between previous locations and the initial estimate of the current location. The processor is operatively connected to the memory 215 for accessing necessary information 219, such as initial estimate of the current location, and previous locations with corresponding path loss exponents.

The components of radio management include radio measurement in managed APs and their clients. One embodiment uses the IEEE 802.11 h standard that modifies the MAC protocol by adding transmission power control (TPC) and dynamic frequency selection (DFS). TPC limits the transmitted power to the minimum needed to reach the furthest user. DFS selects the radio channel at an AP to minimize interference with other systems, e.g., radar.

Another embodiment uses a protocol that differs from the current 802.11 standard by providing for tasking at the AP and, in turn, at a client to autonomously make radio measurements according to a schedule. In one embodiment, the information reported includes, for each detected AP, information about the detection, and information about or obtained from contents of the beacon/probe response.

While the IEEE 802.11 standard specifies that a relative RSS indication (RSSI) be determined at the physical level (the PHY), one aspect of the invention uses the fact that many modern radios include a PHY that provides relatively accurate absolute RSS measurements. In one embodiment, RSS levels measured at the PHYs are used to determine the location.

Some embodiments of the invention use a model of the indoor environment, e.g., a floor plan of a building, wherein the device 200 is located. The locations of any managed APs in the overall region also are known and provided to the method. For example, one embodiment of the invention constructs or uses a user interface that includes the locations of known access points in the area of interest.

Figure 3A:
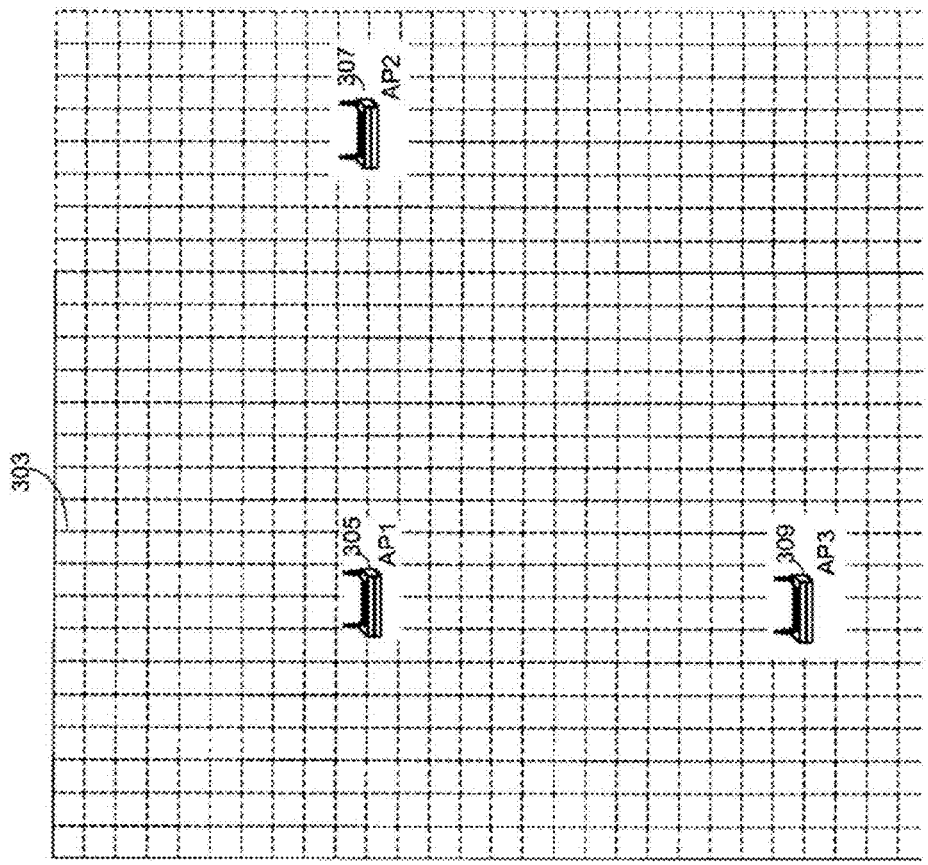
FIG. 3A is an example of a user interface that includes a graphic overlay of a grid of area elements.

FIG. 3A shows one user interface 300 that includes a graphic overlay 303 of a grid of area elements. User interface 300 includes a graphic representation indicating the location of three managed APs, shown as AP1 (305), AP2 (307) and AP3 (309).

Figure 3B:
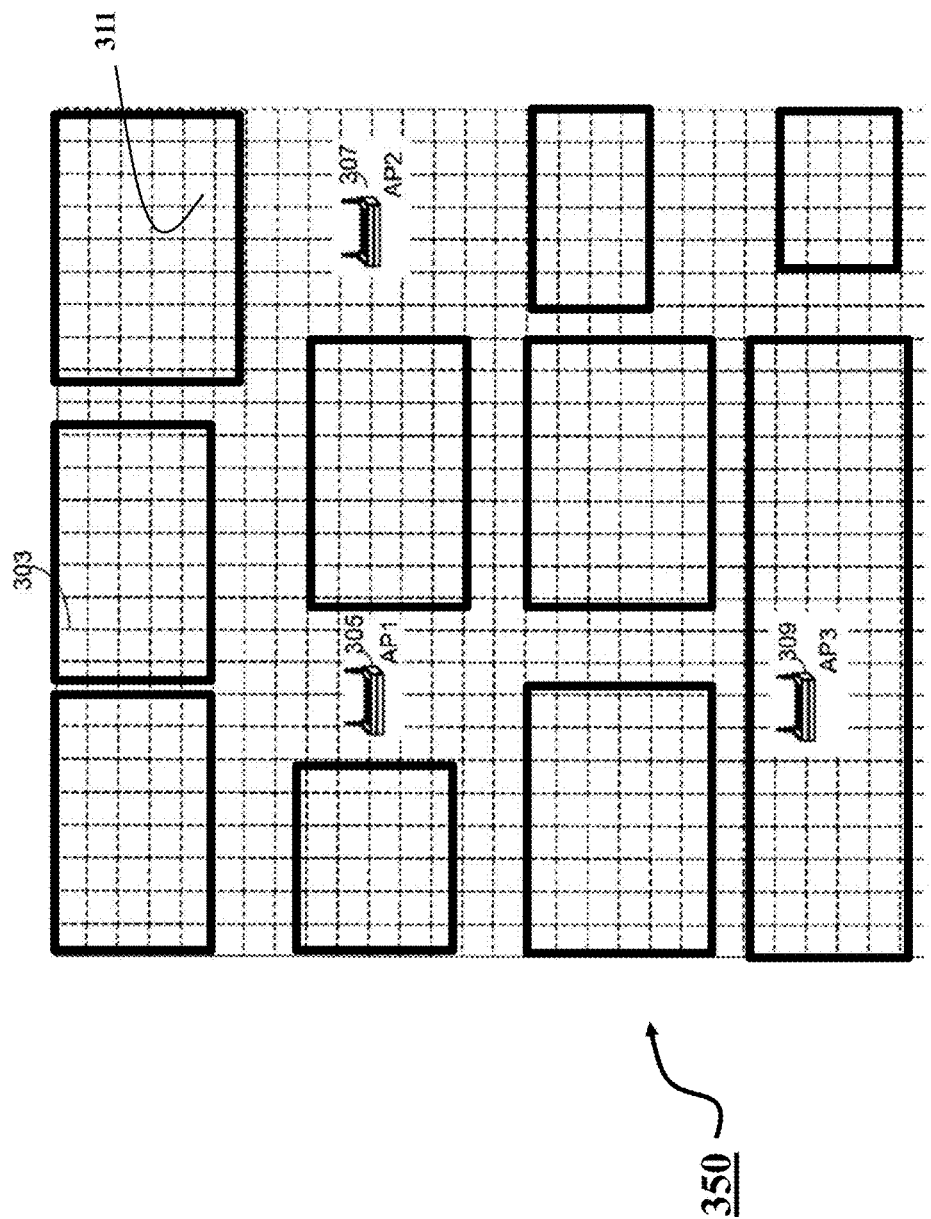
FIG. 3B is another example of the user interface that includes a graphic overlay representing the architectural structure of the enclosed environment.

FIG. 3B shows another user interface 350 that includes in addition to the graphic overlay 303 of the grid and the representation indicating the location of the managed APs 305, 307, and 309, a graphic overlay 311 representing the architectural structure, e.g., as an architectural plan of the interior, e.g., the floor plan of the building. Another user interface (not illustrated) can show the graphic representation of the floor architecture, but no grid. Thus, one embodiment makes possible to view the location of the APs on a two-dimensional screen.

Example of the Tracking Method

Some embodiments of the invention determine a statistical correlation of the path loss exponents using the correlation among locations of the device and the set of path loss exponents for the set of previous locations of the device, and determine the current path loss exponent using the statistical correlation of the path loss exponents, the previous path loss exponents.

For example, one embodiment of the invention uses Gaussian Processes (GP) to estimate path loss exponents corresponding to some location. The GP models highly complicated relation between a location and corresponding path loss exponents associated with different access points. The correlation structure is described via parametrized kernel function, whose hyper-parameters are determined in real time.

Figure 4:
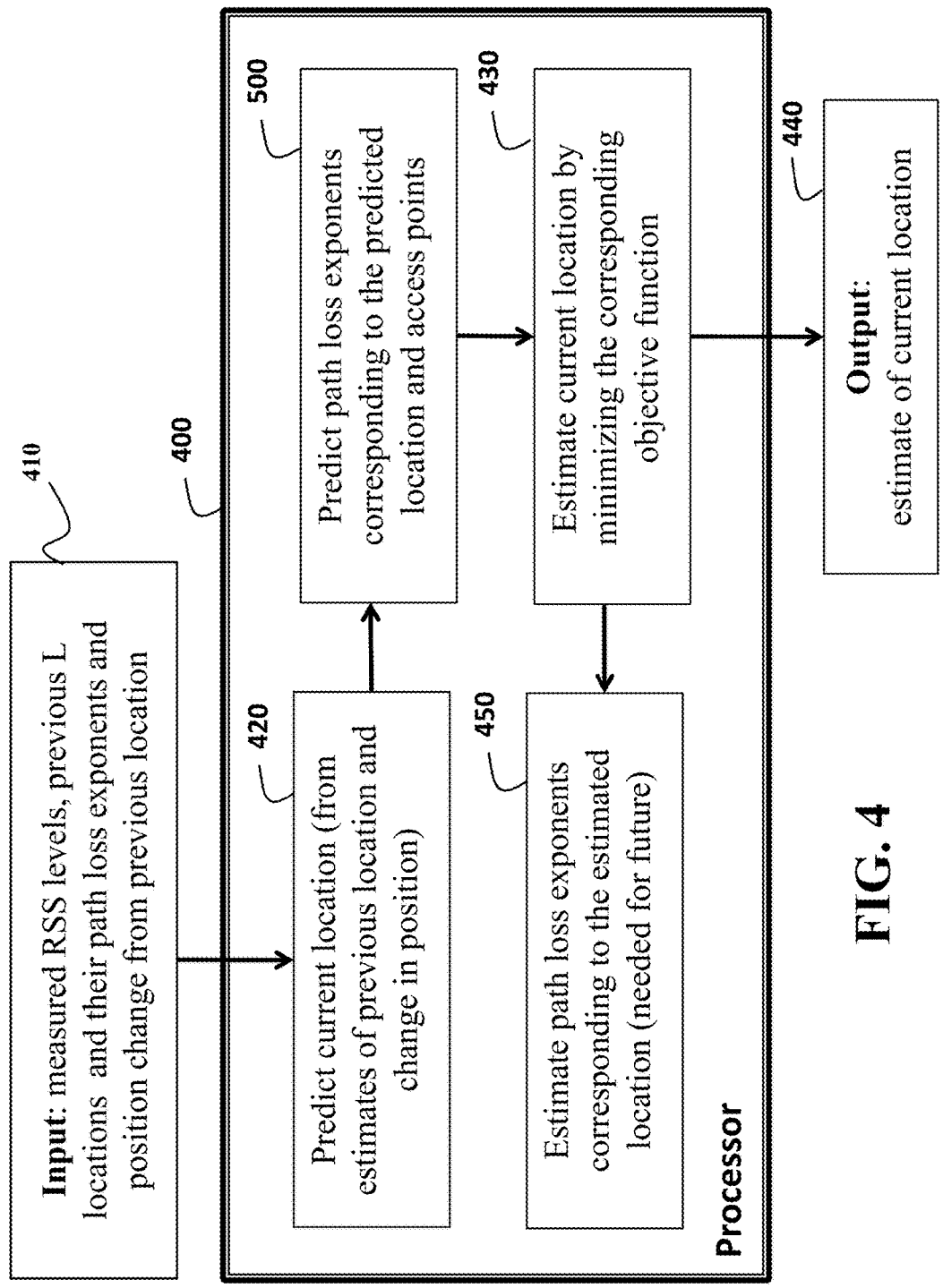
FIG. 4 is a block diagram of a method for determining the location of the device according to one embodiment of the invention.

FIG. 4 shows a block diagram of a method for determining the location of the device according to one embodiment of the invention. The locations $r_1, r_2, \ldots, r_M$ and reference RSS levels $z_1^R, z_2^R, \ldots, z_M^R$ at reference distance $d_0$ of M access points are assumed known and are not explicitly shown in the diagram. The method is at n-th localization request supplied with the measured RSS levels $z_1(n)$, $z_2(n), \ldots, z_M(n)$ and the estimate of the location change $\Delta x$ from the previous localization request. Additionally, the location estimates from L previous localization requests, $x_{n-1}, x_{n-2}, \ldots x_{n-L}$, along with the estimated path loss exponents corresponding to these locations, are used for localization at time n. These all form the input 410 to the processor 400, as shown in FIG. 4. The number of previously estimated locations, L, is the design parameter, determined based on the configuration of the enclosed environment, proximity of consecutive locations and computational resources.

The method determines the current position based on the estimate of the previous position, $x_{n-1}$, and change in coordinates between two localization requests, $\Delta x_n$. The predicted position $x_n$ is evaluated in 420 as $$x_n = x_{n-1} + \Delta x_n. \quad (3)$$

In the next processing stage 500, the path loss exponents corresponding to M access points at the predicted location $x_n$, denoted as $\tilde{h}_1(n), \tilde{h}_2(n), \ldots, \tilde{h}_M(n)$, are estimated. This is achieved by employing the Gaussian Processes (GP) in a supervised manner, where the training data includes L previous location estimates and the associated path loss exponents corresponding to the access points.

The estimate of the location at time n, $x_n$ is obtained from the measured RSS levels $z_1(n), z_2(n), \ldots, z_M(n)$ and predicted path loss exponents $\tilde{h}_1(n), \tilde{h}_2(n), \ldots, \tilde{h}_M(n)$ in 430. This is achieved by observing from (1) that under the assumption that the observation noise $v_m(n)$ is Gaussian distributed, the likelihood of the measured RSS level, $z_m(n)$, is Gaussian, parameterized with path loss exponent $h_m(n)$ and location $x_n$, i.e., $$p(z_m(n); h_m(n), x_n) \sim \mathcal{N}\left(z_m^R - 10 h_m(n)\log_{10}\frac{\|x_n - r_m\|}{d_0}, \sigma^2\right), \quad (4)$$

where $\sigma^2$ is the variance of the noise.

One embodiment optimizes 430 an objective function depending on differences between the received strength levels of the signals at the current location and strength levels of the signals estimated using the path loss model and the current path loss exponents to produce the current location of the device. The measured RSS levels are uncorrelated and the joint likelihood model of the measurements taken at location $x_n$ follows directly from (4). The unknown location $x_n$ is then given as the maximum likelihood (ML) estimate of the joint likelihood model. In one embodiment, the final location is estimated 430 as $$x_n = \arg\min_x \sum_{m=1}^{M}\left(z_m(n) - z_m^R + 10\tilde{h}_m(n)\log_{10}\frac{\|x - r_m\|}{d_0}\right)^2 \quad (5)$$

The solution to the above problem is not given in a closed form. Therefore, we use a gradient based optimization techniques. Note that the gradient and Hessian of the objective function can be computed in a closed form. This step results in $x_n$, which is a final location estimate in 440.

Next, the method updates 450 the estimates of path loss exponents corresponding to current location. These estimates are needed for the following L localization requests. A path loss exponent $h_m(n)$ is obtained as the maximum likelihood estimate corresponding to Gaussian likelihood model (4) for measured RSS level $z_m(n)$ and estimated location $x_n$. That is, $$\hat{h}_m(n) = \frac{z_m^R - z_m(n)}{10\log_{10}\frac{\|x_n - r_m\|}{d_0}}, \qquad (6)$$

where m=1, 2, . . . , M.

Figure 5:
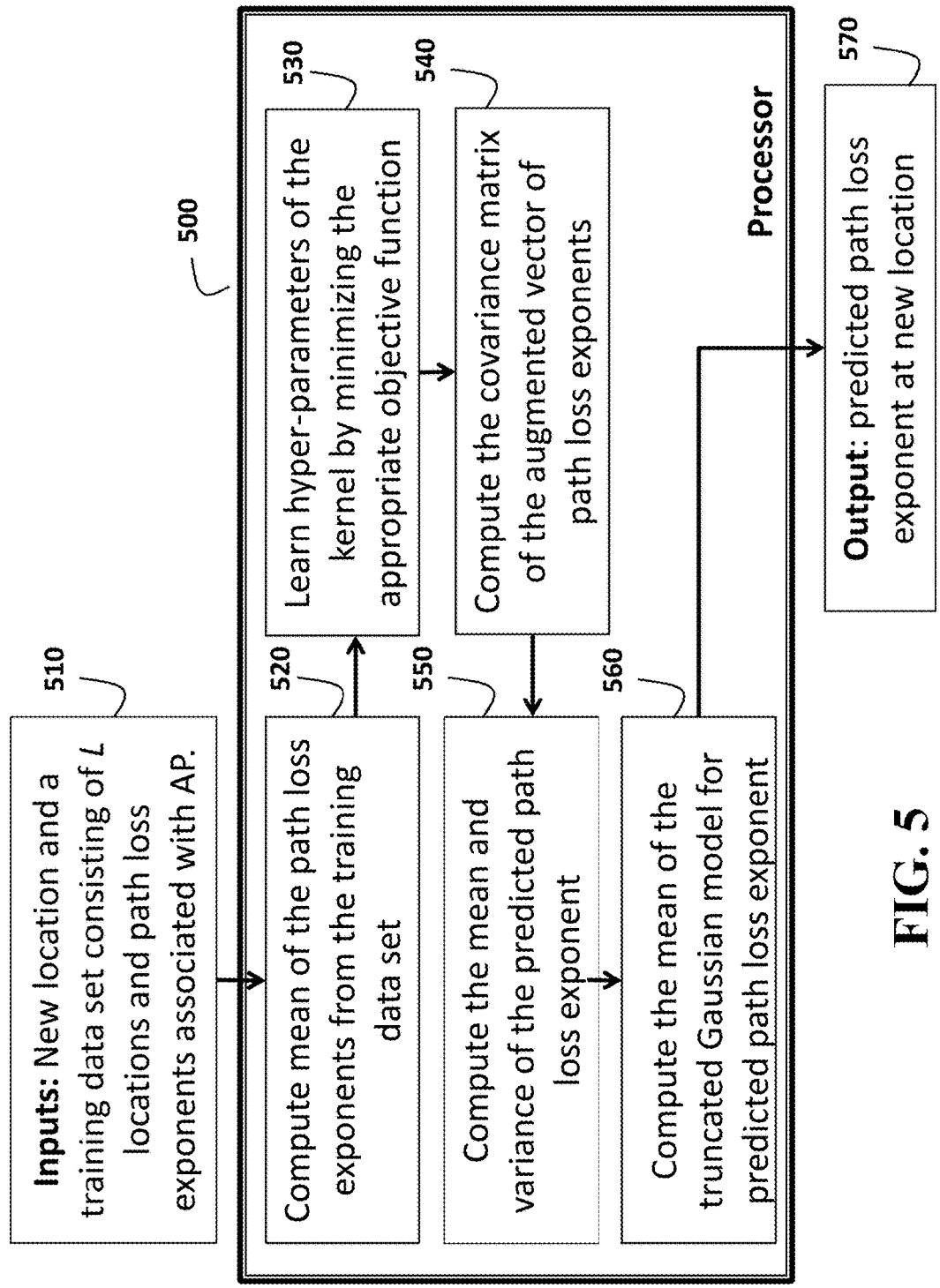
FIG. 5 is a block diagram of a method for determining the current path loss exponent according to one embodiment of the invention.

FIG. 5 shows a block diagram of a method for determining the current path loss exponent according to one embodiment of the invention. The method estimates path loss exponents associated with access points at the predicted location $x_n$, using L previously estimated locations $x_{n-1}, x_{n-2}, \ldots, x_{n-L}$ and the corresponding ML path loss exponents $\hat{h}_1(n-1), \ldots, \hat{h}_M(n-L)$. Because the path loss exponents associated with different access points are uncorrelated, the problem of estimating M path loss exponents (one for each access point) corresponding to location $x_n$ is decoupled into M separate estimation problems. To simplify the notation, the method is described by considering path loss exponents $h_1, h_2, \ldots, h_L$ at respective locations $x_1, x_2, \ldots, x_L$ as the training data set D. Our goal is to predict path loss exponent h at some new location x. This new location and the training data set are the inputs 510 to the method 500.

The path loss exponent associated with a certain access point depends on an indoor location in a highly complicated manner. To model this dependence, some embodiments use Gaussian Processes (GP). According to the GP, the path loss exponents $h_1, \ldots, h_L$, are jointly Gaussian distributed with the mean vector μ and covariance matrix Σ, $$p(h_1, \ldots, h_L | x_1, \ldots, x_L) \sim \mathcal{N}(\mu, \Sigma_\theta). \qquad (7)$$

The means of the path loss exponents are equal such that $\mu = \mu_0 \mathbf{1}$, where 1 is a vector of ones, and $\mu_0$ takes some preset value depending on the enclosed environment and locations of the access points. For example, if there are line of sights between all access points and most locations in the enclosed environment and not much obstacles, one may set $\mu_0$ to be just above 2.

Alternatively, $\mu_0$ is the sample mean of the path loss exponents from the training data set D, evaluated in 520 as $$\mu_0 = \frac{1}{L}\sum_{l=1}^{L} h_l. \qquad (8)$$

The covariance between $h_i$ and $h_j$ depends on the correlation between corresponding locations $x_i$ and $x_j$, and is given by the kernel function which, itself depends on hyper-parameters collected into a vector θ, $$[\Sigma]_{i,j} = \kappa(x_i, x_j; \theta). \qquad (9)$$

An example of a kernel function is the sum of two exponential kernels $$\kappa(x_i, x_j; \theta) = +\alpha_1 e^{-\beta_1 \|x_i - x_j\|^2} + \alpha_2 e^{-\beta_2 \|x_i - x_j\|^2} + \sigma^2 \delta_{i,j}, \qquad (10)$$

where $\theta = [\alpha_1\ \beta_1\ \alpha_2\ \beta_2\ \sigma^2]$ and $\delta(i,j)$ is the Kroneker delta (which is equal to 1 if i=j, and is zero otherwise). Note that with slight abuse of notation, we incorporate the variance $\sigma^2$ of white additive Gaussian measurement noise into the vector of hyper-parameters. For example, the distance between two considered locations is one example of a correlation between these two locations.

The hyper-parameters are unknown and estimated from the training data D. One embodiment determines vector θ that maximizes the joint likelihood of the training data D. Because path loss exponents are jointly Gaussian, the log-likelihood of the training data is given by $$\mathcal{L}(\mathcal{D}, \theta) = -\frac{L}{2}\log(2\pi) - \frac{1}{2}\log(|\Sigma_\theta|) - \frac{1}{2}(h-\mu)^T \Sigma_\theta^{-1}(h-\mu). \qquad (11)$$

Therefore, the ML estimate of the vector of hyper-parameters is given by $$\hat{\theta} = \underset{\theta}{\mathrm{argmin}}\log(|\Sigma_\theta|) + (h-\mu)^T \Sigma_\theta^{-1}(h-\mu), \qquad (12)$$

and evaluated in 530. This optimization problem does not, in general, admit a closed-form solution and is therefore solved numerically by employing one of the gradient based solvers. The gradient, and if necessary, Hessian, can be obtained in a closed form and supplied to the solver.

After the hyper-parameters are estimated, the path loss exponent h at some new location x is determined by noting that the augmented vector of path loss exponents (i.e., $[h^T\ h]^T$) follows a multivariate Gaussian distribution. The covariance matrix of the Gaussian distribution can be determined 540 according to $$\Sigma' = \begin{bmatrix} \Sigma & \kappa \\ \kappa^T & \kappa_0 \end{bmatrix}, \qquad (13)$$

where $\Sigma = \tau_{\theta=\hat{\theta}}$ and k is the vector of covariances between path loss exponent corresponding to the location x and path loss exponents from the training data D.

This vector is evaluated from the kernel function as $$\kappa = [\kappa(x, x_1; \hat{\theta}) \ldots \kappa(x, x_L; \hat{\theta})]^T \qquad (14)$$

The variance of the path loss exponent h, $\kappa_0$ is simply given by $$\kappa_0 = \kappa(x, x; \hat{\theta}). \qquad (15)$$

The distribution of path loss exponent h is obtained from marginalizing the joint Gaussian distribution and is given by $$p(h | \mathcal{D}, x) \sim \mathcal{N}(\mu_x, \sigma_x^2), \qquad (16)$$

where $$\mu_x = \mu_0 + \kappa^T \Sigma^{-1}(h-\mu), \qquad (17)$$

and $$\sigma_x^2 = \kappa_0 - \kappa^T \Sigma^{-1} \kappa. \qquad (18)$$

The mean and variance of this Gaussian distribution are determined 550. Some embodiments are based on recognition that the path loss exponent cannot take negative values, a possibility not excluded in (16). In fact, path loss exponent falls within a range between $h_{min}$ and $h_{max}$ (such as between 2 and 4). Therefore, Gaussian model (16) is truncated between $h_{min}$ and $h_{max}$ and the truncated Gaussian distribution models the path loss exponent h. The predicted value of the path loss exponent, $\tilde{h}$, is the mean of the truncated Gaussian distribution, given by $$\tilde{h} = \mu_x + \frac{\phi(\alpha) - \phi(\beta)}{\Phi(\beta) - \Phi(\alpha)} \sigma_x, \alpha = \frac{h_{min} - \mu_x}{\sigma_x}, \beta = \frac{h_{max} - \mu_x}{\sigma_x}, \quad (19)$$

where $\phi(\alpha)$ and $\Phi(\alpha)$ are, respectively, the probability density function (p.d.f.) and cumulative distribution function (c.d.f.), evaluated at point a. The mean of the truncated Gaussian distribution is determined in 560 and outputted as the current path loss exponent corresponding to location x in 570.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for tracking a device moving along a path in an environment, comprising:
   storing data in a memory connected to the device, the data including an estimated current location of the device on the path, and previous determined locations of the device and their corresponding estimates of path loss exponents for the previous determined locations;
   determining, by the device, estimated path loss exponents corresponding to access points (APs) at the estimated current location, using the previous determined locations of the device and their corresponding estimates of path loss exponents;
   receiving signals from APs arranged in the environment via a transceiver at a current location, wherein the transceiver is connected to the device and computes a received signal strength (RSS) value for each AP at the current location;
   determining, by the device, an updated estimate of the current location of the device according to a path loss model using the determined estimated path loss exponents; and
   determining, by the device, an updated path loss exponent for each AP at the determined updated estimate of the current location of the device according to the path loss model using the computed RSS values from each AP.

2. The method of claim 1, wherein the estimated path loss exponent for each AP at the estimated current location is determined between one or more previous determined locations of the device and their corresponding estimates of path loss exponents for the previous determined locations.

3. The method of claim 1, further comprising:
   determining a probability distribution of the estimated path loss exponents.

4. The method of claim 3, wherein the probability distribution is a truncated Gaussian distribution, further comprising:
   determining the estimated path loss exponents using at least a mean of the truncated Gaussian distribution.

5. The method of claim 4, further comprising:
   determining a mean of a Gaussian distribution of the estimated path loss exponent using a covariance matrix of path loss exponents, wherein the path loss exponents are the estimates of path loss exponents for the previous determined locations; and
   determining the mean of the truncated Gaussian distribution using the mean of the Gaussian distribution.

6. The method of claim 5, further comprising:
   determining a kernel function relating path loss exponents to the corresponding previous determined locations of the device; and
   determining the covariance matrix of path loss exponents using the correlations among the previous determined locations of the device and the kernel function.

7. The method of claim 6, wherein the kernel function is parameterized by hyper-parameters, further comprising:
   determining the hyper-parameters of the kernel function by optimizing an objective function of a joint probability distribution of the path loss exponents for the previous determined locations.

8. The method of claim 1, wherein the stored previous determined locations of the device on the path are sequential in time.

9. The method of claim 1, further comprising:
   determining the estimated current location of the device using inertial measurements.

10. A method for tracking a device moving along a path in an environment, comprising:
    accessing data from a memory by the device, the data including an estimated current location of the device on the path in the environment, and previous determined locations of the device and their corresponding estimates of path loss exponents for the previous determined locations;
    computing, by the device, estimated path loss exponents corresponding to access points (APs) at the estimated current location, using the previous determined locations of the device and their corresponding estimates of path loss exponents;
    receiving signals from APs arranged in the environment at a current location by the device, wherein the device computes a received signal strength (RSS) value for each AP at the current location;
    determining, by the device, an updated estimate of the current location of the device according to a path loss model using the determined estimated path loss exponents; and
    determining, by the device, an updated path loss exponent for each AP at the determined updated estimate of the current location of the device according to the path loss model using the computed RSS values from each AP.

11. The method of claim 10, wherein the determining the updated estimate of the current location of the device comprises:
    determining an objective function depending on differences between the computed RSS values from each AP and estimated RSS values using the path loss model and the estimated path loss exponents; and
    optimizing the objective function to produce the updated estimate of the current location of the device.

12. The method of claim 11, wherein the objective function is $$x_n = \underset{x}{\operatorname{argmin}} \sum_{m=1}^{M} \left( z_m(n) - z_m^R + 10\tilde{h}_m(n) \log_{10} \frac{\|x_n - r_m\|}{d_0} \right)^2,$$

wherein M is the number of access points in the enclosed area, $z_m(n)$ is the computed RSS value from the m-th access point at the n-th location, $z_m^R$ is the reference signal level of the m-th access point at the reference distance $d_0$, x is the vector containing coordinates of the location of the device, $r_m$ is the location vector of the m-th access point, and $\hat{h}_m(n)$ is the path loss exponent corresponding to the m-th access point at the n-th location.

13. The method of claim 10, further comprising:
determining, for each AP, a mean and a variance of a Gaussian distribution of the estimated path loss exponent;
truncating the Gaussian distribution between a minimum value and a maximum value of the path loss exponent to produce a truncated Gaussian distribution; and
determining the estimated path loss exponent corresponding to the AP using at least a mean of the truncated Gaussian distribution.

14. The method of claim 13, further comprising:
determining the mean and the variance of the Gaussian distribution using a kernel function parametrized with hyper-parameters and the correlations among the locations of the device.

15. The method of claim 14, further comprising:
determining the hyper-parameters by optimizing an objective function which depends on a joint Gaussian distribution of the estimates of path loss exponents corresponding to the previous determined locations.

16. The method of claim 15, further comprising:
determining a covariance matrix of the joint Gaussian distribution as a function of hyper-parameters using the correlations among previous determined locations of the device.

17. The method of claim 10, wherein the device iteratively computes an updated estimate of current location of the device after the determining of the estimated current location, such that the updated estimate of current location of the device is outputted after each iteration, and wherein the updated path loss exponents for that location are stored in the memory and used for further iterations.

18. A device, comprising:
a memory to store data, the data including an estimated current location of the device on a path in an environment, and previous determined locations of the device on the path in the environment and their corresponding updated path loss exponents;
a controller, determines estimated path loss exponents corresponding to access points (APs) at the estimated current location, using the previous determined locations of the device and their corresponding estimates of path loss exponents; and
a transceiver, receives signals from APs arranged in the environment at a current location, to determine a received signal strength (RSS) value for each AP at the current location,
wherein the controller is to determine, an updated estimate of the current location of the device according to a path loss model using the estimated path loss exponents, and to determine an updated path loss exponent for each AP at the current location of the device according to the path loss model using the RSS values.

19. The device of claim 18, wherein the controller is configured for
determining hyper-parameters of a kernel function by optimizing an objective function of a joint probability distribution of the path loss exponents for the previous determined locations, wherein the kernel function relates path loss exponents to corresponding locations;
determining a covariance matrix of path loss exponents using the correlations among locations of the device and the kernel function;
determining a probability distribution of the path loss exponent at the current location using the covariance matrix of path loss exponents; and
determining the estimated path loss exponents using the probability distribution.

20. The device of claim 19, wherein the probability distribution is a truncated Gaussian distribution.

* * * * *